US006478976B1

(12) United States Patent
Lepert et al.

(10) Patent No.: US 6,478,976 B1
(45) Date of Patent: Nov. 12, 2002

(54) APPARATUS AND METHOD FOR CONTACTING A CONDUCTIVE LAYER

(75) Inventors: Arnaud Yves Lepert, Lafayette, CA (US); Danielle A. Thomas, Dallas; Antonio A. Do-Bento-Vieira, Coppell, both of TX (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/224,815

(22) Filed: Dec. 30, 1998

(51) Int. Cl.$^7$ ............................. H01L 21/00; H01B 13/00
(52) U.S. Cl. ............................. 216/18; 216/13; 216/17; 216/79; 438/720
(58) Field of Search ............................. 216/13, 17, 18; 438/720, 725

(56) References Cited

U.S. PATENT DOCUMENTS

| | | |
|---|---|---|
| 3,921,167 A | 11/1975 | Fox .......................... 340/365 C |
| 3,974,332 A | 8/1976 | Abe et al. ...................... 178/18 |
| 4,194,083 A | 3/1980 | Abe et al. ...................... 178/18 |
| 4,290,052 A | 9/1981 | Eichelberger et al. .. 340/365 C |
| 4,394,773 A | 7/1983 | Ruell ............................. 382/4 |
| 4,766,474 A | 8/1988 | Nakagawa et al. ........ 357/23.8 |
| 5,331,580 A | 7/1994 | Miller et al. ................. 364/708 |
| 5,463,388 A | 10/1995 | Boie et al. .................... 341/33 |
| 5,514,612 A | 5/1996 | Rao et al. .................... 437/51 |
| 5,648,642 A | 7/1997 | Miller et al. ................. 178/18 |
| 5,778,089 A | 7/1998 | Borza .......................... 382/124 |
| 5,847,690 A | 12/1998 | Boie et al. ................... 345/104 |
| 5,862,248 A | 1/1999 | Salatino et al. ............. 382/124 |
| 5,907,627 A | 5/1999 | Borza .......................... 382/124 |
| 5,994,781 A * | 11/1999 | Smith .......................... 257/773 |
| 6,001,743 A * | 12/1999 | Lee et al. .................... 438/706 |
| 6,008,088 A | 12/1999 | Wu ............................. 438/210 |
| 6,016,008 A * | 1/2000 | Feldner ....................... 257/751 |
| 6,091,082 A | 7/2000 | Thomas et al. ................ 257/77 |
| 6,107,109 A * | 8/2000 | Akram et al. .................. 438/15 |
| 6,114,862 A | 9/2000 | Tartagni et al. ............. 324/662 |
| 6,163,313 A | 12/2000 | Aroyan et al. ............... 345/173 |
| 6,180,989 B1 * | 1/2001 | Bryant et al. ............... 257/414 |

FOREIGN PATENT DOCUMENTS

| | | | |
|---|---|---|---|
| EP | 0 790 479 A1 | 8/1997 | ............ G01B/7/00 |
| JP | 404/025200 A | 1/1992 | ............ H05K/7/14 |
| WO | WO 94/05042 | 3/1994 | ............ H01L/27/02 |
| WO | WO 98/52147 | 11/1998 | ............ G06K/9/20 |

OTHER PUBLICATIONS

"Physics of Semiconductor Devices", by S.M. Sze, John Wiley & Sons, Inc., 1981, pp. 30–33.
"A Fingerprint Sensor Based on the Feedback Capacitive Sensing Scheme", by Marco Tartagni and Guerrieri, IEEE Journal of Solid–State Circuits, Vo. 33, No. 1, Jan., 1998.

* cited by examiner

*Primary Examiner*—Randy Gulakowski
*Assistant Examiner*—Shamim Ahmed
(74) *Attorney, Agent, or Firm*—Lisa K. Jorgenson; William A. Munck

(57) ABSTRACT

A structure and method for creating a contact between a conductive layer and a pad for dissipating electrostatic charges comprising the steps of, forming a pad and a composite insulating layer between and over conductive plates on a substrate, wherein the insulating layer isolates and protects the conductive plates and pad from damage, the insulating layer comprising a dielectric region underlying a conductive layer. A passivation layer is formed over at least a portion of the conductive layer and a photoresist is patterned over at least a portion of the passivation. An opening is etched through the passivation and the insulating layers, wherein the photoresist and the conductive layer serve as masks. Finally, a conductive material is deposited in the opening to form an electrical contact between the pad and the conductive layer.

36 Claims, 3 Drawing Sheets

APPARATUS AND METHOD FOR CONTACTING A CONDUCTIVE LAYER

CROSS REFERENCE TO A RELATED APPLICATION

The following related patent applications, each showing a type of electrostatic discharge protection method and apparatus, are incorporated herein by reference and with which the present invention finds utility: U.S. patent application Ser. No. 08/927,450, filed Sep. 11, 1997 and titled ELECTROSTATIC DISCHARGE PROTECTION OF A CAPACITIVE TYPE FINGERPRINT SENSING ARRAY; U.S. patent application Ser. No. 09/144,182, filed Aug. 31, 1998, and titled SELECTIVELY DOPED ELECTROSTATIC DISCHARGE LAYER FOR AN INTEGRATED CIRCUIT SENSOR, now U.S. Pat. No. 6,180,989; U.S. patent application Ser. No. 09/224,812, filed Dec. 30, 1998, and titled STATIC CHARGE DISSIPATION FOR AN ACTIVE CIRCUIT SURFACE; U.S. patent application Ser. No. 09/223,706, filed Dec. 30, 1998, and titled STATIC CHARGE DISSIPATION PADS FOR SENSORS; U.S. patent application Ser. No. 09/223,346, filed Dec. 30, 1998, and titled APPARATUS AND METHOD FOR CONTACTING A SENSOR CONDUCTIVE LAYER; U.S. patent application Ser. No. 09/223,707, filed Dec. 30, 1998, and titled TOPOGRAPHICAL ELECTROSTATIC PROTECTION GRID FOR SENSORS; and U.S. patent application Ser. No. 09/223,629, filed Dec. 30, 1998, and titled ELECTROSTATIC DISCHARGE PROTECTION FOR SENSORS.

TECHNICAL FIELD OF THE INVENTION

The present invention relates in general to the field of static discharge dissipation for use with a sensor, and more particularly, to a method of forming a contact for an embedded conductive layer with a reduced number of photolithographic steps.

BACKGROUND

Without limiting the scope of the invention, its background is described in connection with the protection of integrated circuit fingerprint sensors from the environment during regular use, as an example.

Heretofore, in this field, the detection of fingerprint patterns, composed of lines or ridges and valleys, has been useful for the identification of specific individuals based on the observation that each individual person has a unique fingerprint. Fingerprints, therefore, can be used not only to positively identify individuals, but to exclude individuals whose fingerprint profile does not match a pre-existing set of patterns.

Fingerprint sensing has evolved from optical and mechanical sensing technologies that acquire a fingerprint image. In those systems, generally, the mechanical and optical sensors obtain a fingerprint image using a scanner or a camera, process the acquired information into an analog or digital signal that can be analyzed, and provide an output based on the acquired signal. Unfortunately, the lighting and contrast conditions available at the time the image is acquired affects the analysis of the acquired data and consequently affects the sensor output. Furthermore, image capture systems are easily tricked using a false images. In addition, conventional optical sensors usually require bulky optics, making these types of sensors impractical for portable systems.

Another class of fingerprint sensors are capacitive sensors, such as that disclosed in U.S. Pat. No. 4,353,056 issued to Tsikos. The Tsikos patent demonstrates the use of a sensor that incorporates a sensing member that has a sensing surface for receiving a fingerprint. The sensing surface has a means for sensing the ridges and valleys of the skin of the finger under observation. The sensing member contains a multitude of capacitors that sense the patterns of the fingerprint when the finger is pressed against the sensing surface. The information obtained by the sensing member is transformed into an electric signal. The capacitors are insulated from the environment of use by a flexible membrane that conforms itself to the contour of the fingerprint. Unfortunately, the repeated cycles of flexing and compression of the flexible membrane can lead to device failure and the need to replace the membrane.

U.S. Pat. No. 4,385,831 issued to Ruell, et al., discloses a fingerprint sensor that provides an electrical output signal in response to the topography of the fingerprint. The sensor incorporates a contact body that is formed, at least in part, by a light transparent elastic material. The elastic contact material may be attached to a flat sensor plate that has a light receiving surface. The sensor also incorporates a light source and a photodetector to measure the valleys and ridges of the fingerprint. The elastic nature of the contact body causes cycles of compression and flexing that again lead to the deterioration of the contact point between the sensor and the finger.

It has also been found that the current methods and structures for protecting sensors from the environment of intended use fail to address the distinct environmental exposures to which the sensors are exposed, in particular, electrostatic build-up on, e.g, human skin or any other object come into close proximity with or contact the sensor. Sensor protection versus sensitivity must generally be carefully balanced to achieve both an acceptable signal-to-noise ratio and adequate protection. The present inventors have recognized that the number of photolithographic masking steps for creating an electrostatic discharge structure may be reduced by using the present invention.

The electrostatic discharge sensor protection and sensor sensitivity must be carefully balanced to achieve both an acceptable signal-to-noise ratio and adequate protection. Generally, as sensor protection increases, sensor sensitivity decreases. In the case of electrical damage to sensor surface structures or the active circuits that form part of the sensor circuitry during use, present electrostatic discharge circuitry fails to protect the sensor circuitry during an electrostatic discharge.

As sensors and users can be exposed to a wide variety of environmental conditions that can cause a great increase in electrical potential in comparison to objects that are at a different potential or grounded, it has now been found that sensors should be fitted with electrostatic discharge protection be durable. For example, when the user approaches the sensor at a great voltage disparity, a sudden electrical discharge may cause operational failure of the sensor, such failure may be temporary or permanent.

Typical electrostatic discharge protection circuits for solid state arrays may be relatively poor, since in this type of circuit configuration, it is usual to connect the cell's buried and ungrounded capacitor plates to transistor gates and/or to connect the cell's ungrounded and buried capacitor plates to system ground potential by way of reverse biased diodes. In this type of construction and arrangement, the electrostatic charge sometimes carried by a human body and its fingertip, which may be in the range of several kilo volts (kV) or more, may be sufficiently high to break through the solid state cell's upper dielectric/passivation layer. If this breakthrough occurs, the potential is raised at ungrounded circuit nodes that are associated with the buried capacitor plates and may cause damage to the associated array cell. Damage to the data or the sensor must be avoided, while the sensitivity of the sensor is maintained at close to optimal levels.

Another significant problem of the current structures for the protection of fingerprint sensors is contamination from substances, such as oils and proteins that are found on the surface of fingers. To remove these contaminants, it is often necessary to use organic or inorganic solvents or detergents to clean the sensor surface. Therefore, the electrostatic discharge protection must be resistant to these often corrosive compounds.

Another area of concern is hygiene. Fingers, as well as the environment, tend to contain a number of microbes and bacteria that are removed from the sensor along with the other contaminants. To remove these microbes and bacteria and reduce the chance of contagion between users, antibacterial, antifungal and decontaminating agents are often used to clean the sensors. These decontaminating agents often include harsh abrasives, enzymes, organic or inorganic solvents or detergents. Therefore, any electrostatic discharge protection must be resistant to these often corrosive cleaning compounds.

What is needed is a structure and method to protect sensors from electrostatic discharges, while at the same time maintaining the sensors ability to withstand mechanical stress. The structure must not only permit continued functioning of the sensor during normal use, but also withstand, among others, the extreme conditions of humidity, electricity, heat, light, etc., to which the sensor may be exposed. The sensor electrostatic discharge structure should also be resistant to chemical detergents and solvents, but still be compatible with the underlying components of the sensor.

SUMMARY OF THE INVENTION

The present invention provides a method of and system for providing electrostatic discharge capability for a sensor circuit, such as a fingerprint sensor. In a type of sensor array with which this invention finds utility, each sensing cell includes ungrounded metal capacitor plates covered by a dielectric. An ungrounded object, such as a fingertip which comes close to or in contact with the dielectric forms a third capacitor plate between the metal capacitor plates. An electrostatic charge sometimes carried by a human body may be sufficiently high to break through the dielectric layer covering the metal capacitor plates. The present invention improves the electrostatic discharge performance of such a sensor array.

The present invention is directed to a process and apparatus for using an integrated sensor mask for making a contact between layers in an integrated circuit including, providing a substrate having disposed thereon a sensor and an electrically conductive pad. An insulating layer is disposed over the sensor to electrically isolate the sensor, as is a conductive layer that is disposed over the insulating layer at the pad. A passivation layer is disposed over the conductive layer, wherein the conductive layer serves as a mask during an etching step that forms an opening in the passivation and insulating layer.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of ways to make and use the invention and do not delimit the scope of the invention.

Figure 1:
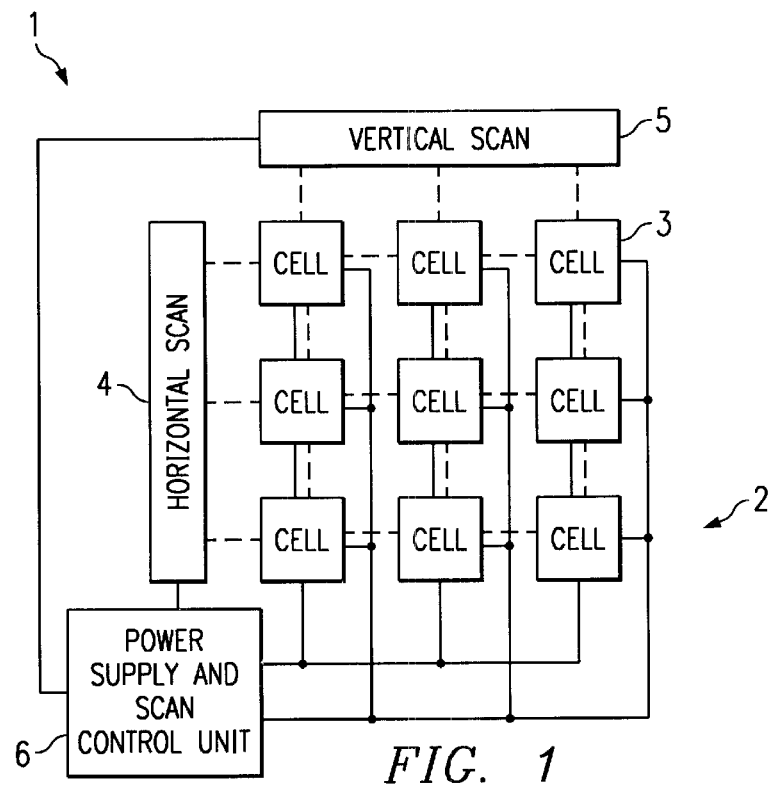
FIG. 1 is a block diagram of a sensor array according to the present invention.

By way of background, referring now to FIG. 1, there is shown a block diagram of a user input device 1. User input device 1 is preferably integrated into a single chip, and it includes an array 2 of sensors or pixel cells 3. For purposes of illustration, array 2 is shown comprising nine cells 3. In an actual device, more than nine cells would more likely be included. Each individual sensing cell 3 represents one pixel of the array 2 and is generally smaller than the width of a fingerprint ridge. Enough cells 3 are included in array 2 so that several ridges and valleys of a fingerprint may be detected. In a preferred embodiment, pixel cells 3 are on a pitch of approximately 50 $\mu$m, which corresponds to a resolution of approximately 508 dots per inch (dpi) for a fingerprint image.

Device 1 includes a horizontal scanning stage 4 and a vertical scanning stage 5. Scanning stages 4 and 5 enable detection from one cell in array 2 at a time according to a predetermined scanning pattern.

Input sensor device 1 includes a power supply and scan control unit 6. Power supply and scan control unit 6 supplies a reference voltage to each cell 3 of array 2. Power supply and scan control unit 6 also operates to scan stages 4 and 5 to produce the desired scanning of cells 3.

Figure 2:
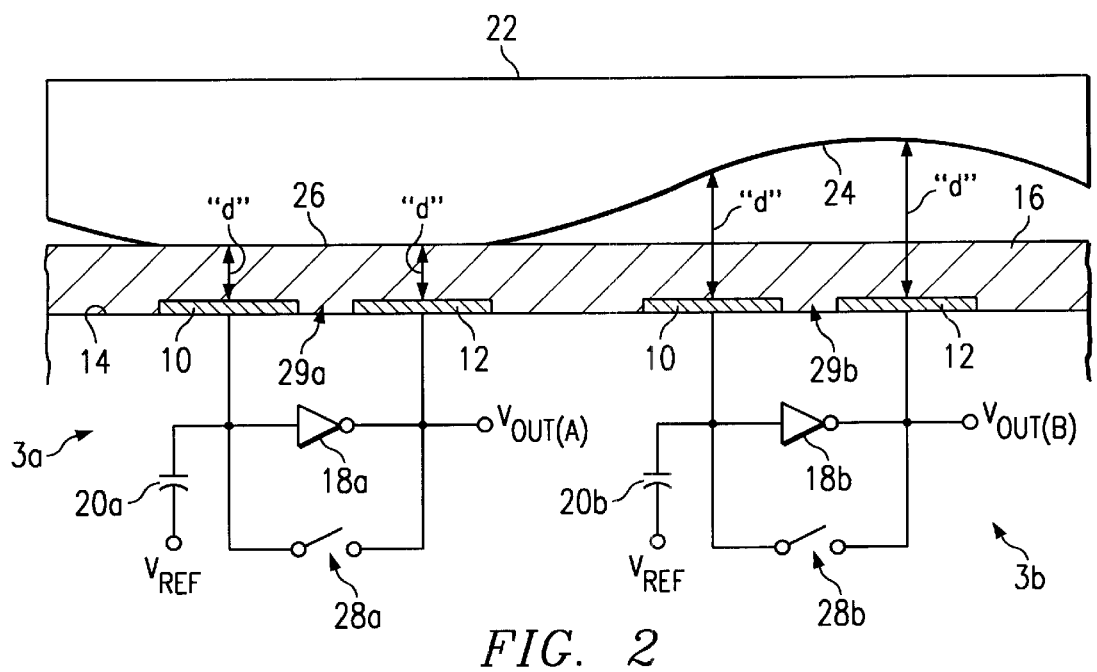
FIG. 2 illustrates the physical structure of the individual sensor cells and their electrical operation according to the present invention.

By way of further background, referring now to FIG. 2, there is illustrated the structure and operation of a cell 3. The preferred cell of the present invention is of the type disclosed in Tartagni, U.S. patent application Ser. No. 08/799,543, filed Feb. 13, 1997, now U.S. Pat. No. 5,864,830 titled CAPACITIVE DISTANCE SENSOR, the disclosure of which is incorporated herein by reference. The technology of the present invention utilizes an active pixel design based on a capacitive feedback sensing circuit.

Each cell 3 (3a, 3b) includes a first conductor plate 10 and a second conductor plate 12 supported on a semiconductor substrate, which is preferably a conventional silicon substrate that may have a shallow epitaxial layer at an upper surface region 14 of the silicon substrate. The top surface of the substrate includes an insulating layer 16. Insulating layer 16 is preferably an oxide layer, which may be a conventional thermally deposited silicon dioxide layer. Insulating layer 16 may further comprise a protective or passivation coating preferably of a hard or ultra-hard material. With an added protective coating, insulating layer 16 protects sensor 3 from abrasion, contamination, and electrostatic discharge.

Each cell 3 includes a high-gain inverting amplifier 18 (18a, 18b). The input of amplifier 18 is connected to a reference voltage source $V_{ref}$ through an input capacitor 20 (20a, 20b). The output of each amplifier 18 is connected to an output $V_{out}$ ($V_{outa}$, $V_{outb}$) The input of each amplifier 18 is also connected to the respective conductor plate 10 and the output of each amplifier 18 is also connected to the respective conductor plate 12, thereby creating a charge integrator whose feedback capacitance is the effective capacitance between the two conductor plates 10 and 12.

When no object is placed on the surface of insulating layer 16, the effective capacitance between plates 10 and 12 is the fringing capacitance seen through layer 16 and the air near the surface of the sensor at region 29 (29a, 29b). The distance between plates 10 and 12 at region 29 is approximately 2 microns. When an object 22, such as a finger, is placed on the surface of insulating layer 16, the conductive properties of the object (e.g., skin surface) and the proximity of the object to the sensor surface will act to modify the capacitance coupling between plates 10 and 12. The object is separated from plates 10 and 12 by a total dielectric layer that includes both the insulating layer 16 and a variable thickness of air between layer 16 and the object. Because fingerprint valleys or pores 24 will be farther from the sensor surface than finger ridges 26, sensors 3 beneath valleys or pores 24 will have more distance between their conductor plates 10 and 12 and the skin surface than sensors 3 under ridges 26. The thickness "d" of this total dielectric layer will modulate the capacitance coupling between plates 10 and 12 of each cell 3. Accordingly, sensors 3 under valleys or pores 24 will exhibit a different effective capacitance than sensors 3 under ridges 26. As shown in FIG. 2, the effective capacitance of sensor 3a is different from the effective capacitance of sensor 3b. $V_{OUTA}$ will differ from $V_{OUTB}$ since $V_{OUT}$ is inversely proportional to the effective feedback capacitance.

Scanning stages 4 and 5 of FIG. 1 now operate to sequentially enable the reading or interrogation of the many cells 3 within array 2. Sensors 3 work in two phases. During the first phase, the amplifier 18 is reset with a switch 28 (28a, 28b) by shorting the input and output of amplifier 18. This causes amplifier 18 to settle at its logical threshold. During the second phase, a fixed charge is input to the amplifier, causing an output voltage swing inversely proportional to the feedback capacitance, which is the effective capacitance between conductor plates 10 and 12. This effective feedback capacitance is now the capacitance between plates 10. and 12 seen across the total dielectric at a distance "d" which includes layer 16 and air between the finger 22 and the top of layer 16.

For a fixed amount of input charge, the output of amplifier 18 will range between two extremes depending on the effective feedback capacitance value. The first extreme is a saturated voltage level if the effective feedback capacitance is very small. The second extreme is a voltage close to the logical threshold, which is the reset value, when the effective feedback capacitance is large. Since the distance between the skin and the sensor changes the effective feedback capacitance of the charge integrator, the output of sensor 3a under ridge 26 will be different from the output of sensor 3b under valley 24. The entire fingerprint pattern can thus be digitized by sensing the differences in adjacent pixel cell capacitive values. It is also important to note that a conductive path to ground should be provided to or around each pixel (not shown), such that an electrostatic discharge is dissipated though the conductive path to ground rather than through the circuitry of the pixel and to ground. To be effective, such electrostatic discharge layer must present a more conductive path to ground than any paths to ground through the internal circuitry of the pixels and any dielectrics insulating the circuitry from the environment.

The structure and method of the present invention may be used with a wide variety of imaging sensors, such as the fingerprint sensor described herein by way of example, and as will be known to those skilled in the art in light of the present disclosure.

As noted above, in using the described capacitance-coupled sensor, resolutions of up to 508 dpi can be achieved. With improvements in image processing algorithms, sensors having a resolution of 750 dpi, or more, can be expected. For use in sensing fingerprint valleys and ridges, an array 2 of cells is used to sample the fingerprint pattern. The entire chip may also contain additional timing and voltage controls and references in addition to the above described controls and references.

The structure and method for dissipating the electrostatic discharge and protecting the pixel cell will now be described. Electrostatic discharge protection relative to electrostatic potential that may be carried by an object such as an ungrounded fingertip, is provided by placing a number of conductive paths within the insulating layer 16. Each pixel cell 3, such as a capacitively coupled fingerprint sensor, is formed on a silicon substrate 13. Substrate 13 may have P-type or N-type conductivity. Substrate 13 may be made of, for example, silicon, glass, allium arsenide, silicon on insulator (SOI) structures, epitaxial formations, germanium, germanium silicon, polysilicon, amorphous silicon or the like semi-conductive or conductive substrates. Substrate 13 is typically made of single crystal silicon, and may be lightly doped with boron, phosphorous or arsenic atoms depending upon the desired conductivity.

Figure 3:
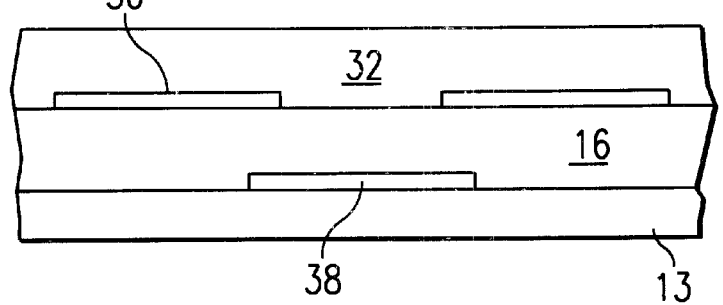
FIGS. 3 through 7 are cross-sectional views of the layers of the embedded conductive layers as they are processed.

The structure for making a electrostatic discharge layer and method for forming and connecting the pixel cell will now be described. Referring to FIG. 3, forming the contact for a conductive layer for use with the present invention, in one embodiment, is further described.

In FIG. 3, a cross-sectional view of an insulating or dielectric layer 16 may be formed over conductor plates (not shown) and substrate 13, preferably by deposition techniques using plasma enhanced chemical vapor deposition (PECVD) to a thickness which will electrically isolate subsequent layers from conductor plates and substrate 13. Dielectric layer 16 may be formed of any suitable dielectric material and thickness which ensures electrical isolation, for example, silicon dioxide or glass. The glass may contain, e.g., phosphorous or boron and phosphorous, which may serve to trap sodium ions from objects, such as the skin. The thickness of dielectric layer 16 may be varied, for example, by changing the time of deposition. Dielectric layer 16 is preferably between 6,000 and 12,000 angstroms. Alternatively, dielectric layer 16 may be a composite layer having a first dielectric layer and a second dielectric layer, formed of compatible dielectric materials with desired dielectric constants. If a composite layer is formed, the first layer is preferably silicon dioxide or glass and the second layer is preferably silicon nitride. Each of these first and second layers may have a thickness between approximately 3,000 and 6,000 angstroms. Disposed over at least a portion of dielectric layer 16 is a conductive layer 30, which may be sputtered or may also be deposited, for example, by PECVD as will be more fully described below.

A passivation layer 32 is formed, if desired, over or adjacent to conductive layer 30 and over exposed dielectric layer 16, and may also be deposited by, e.g., PECVD. The overlying passivation layer 32 may be, e.g., a hard material suitable for protecting the sensor, such as silicon carbide or a combination of silicon carbide and silicon nitride. This overlying passivation layer 32, if formed, should be thick enough to protect the sensor from abrasion and contamination yet thin enough to allow the conductive layer 30 to transfer the electrostatic discharge crated at the surface of layer 16 away from the active circuits of cells 3 of array 2. In a preferred embodiment, passivation layer 32 is between approximately 2,000 and 3,000 angstroms. The conductive layer 30 may be further coupled to a charge dissipation circuit (not shown), providing a conductive path to ground that is more conductive than any path to ground through the internal circuitry of the pixels and any dielectrics insulating the circuitry from the environment. Passivation layer 32 is shown here as a planar layer, which may be achieved by etch back to form a substantially planar layer or by formation from a material that is planar when formed, such as a spin-on-glass. Alternatively, the passivation layer 32 may be conformal, such as when layer 16, 30 and 32 are formed in sequence following the formation of the electrically conductive connection pad 38. In one embodiment, pad 38 serves as the ground for the electrostatic discharge protection, the ground being different from the ground of the sensor circuitry.

The overlying passivation layer 32 provides durability to the underlying sensor, and more particularly, to the entire insulating layer 16. The thickness, composition and location of conductive layer 30 may be varied to optimize its ability to carry the electrostatic discharge away from sensor 3 while minimizing the effect on the sensitivity of sensor 3 caused by placing conductive layer 30 between the capacitance source, e.g., a finger, and the conductor plates.

The thickness of the conductive layer 30 may be between approximately 500 and 15,000 angstroms depending upon the desired material. The thickness of conductive layer 30 may also be increased or decreased depending on, e.g., the desired ratio of the dielectric material to conductive material in layer 16, desired resistivity levels, shape and size of layer 16, and the like. The composition of conductive layer 30 may be formed from any suitable material for charge carrying capacity and for additional damage protection. For example, aluminum or an aluminum alloy may be formed to a thickness between approximately 5,000 and 15,000 angstroms having a resistivity of approximately 0.04 ohms per square. Alternatively, a titanium layer may be formed to a thickness between approximately 500 and 1,000 angstroms with a resistivity of approximately 10 ohms per square. Alternatively, a tungsten layer may be formed to a thickness of between approximately 4,000 and 8,000 angstroms having a resistivity of approximately 0.14 ohms per square.

The conductive material chosen should have a sheet resistance low enough to allow the electrostatic charge to dissipate through this layer to prevent the electrostatic charge from reaching conductor plates 10 and 12 (see FIG. 2). The materials used for each of layers 16, 30 and 32 should be chosen to minimize adhesion problems between the layers which could detrimentally affect the underlying sensor performance.

The conductive layer 30 may be deposited using the same equipment that is presently used to create the dielectric layer 16 for use with, e.g., a fingerprint sensor. Thus, the present invention presents additional advantages in cost and efficiency in manufacturing. By using the current PECVD equipment, the entire layer 16 may be deposited at relatively low temperatures, e.g., 300 degrees Celsius or less.

In one embodiment for forming conductive layer 30, by way of example, a titanium layer is initially blanket deposited followed by forming titanium nitride over the titanium. Next, tungsten is formed over the titanium nitride to form a composite conductive layer 30. Pad 38 may be formed of the same materials and in the same way as conductive layer 30.

Figure 4:
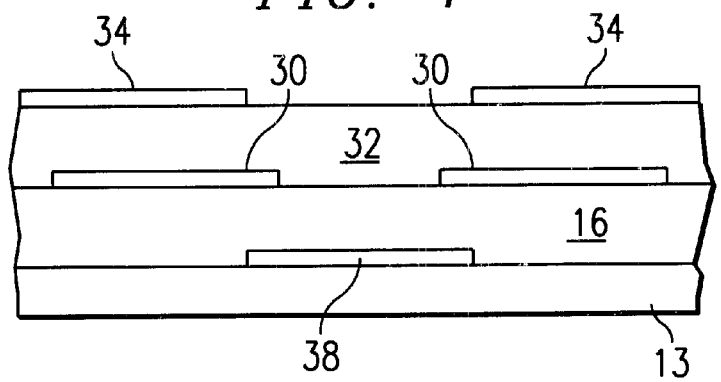

FIG. 4 shows the next step in the formation of a contact for embedded conductive layer 30 in which a photoresist 34 is patterned over the passivation layer 32 in a position adjacent to the embedded conductive layer 30 below the passivation layer 32.

Figure 5:
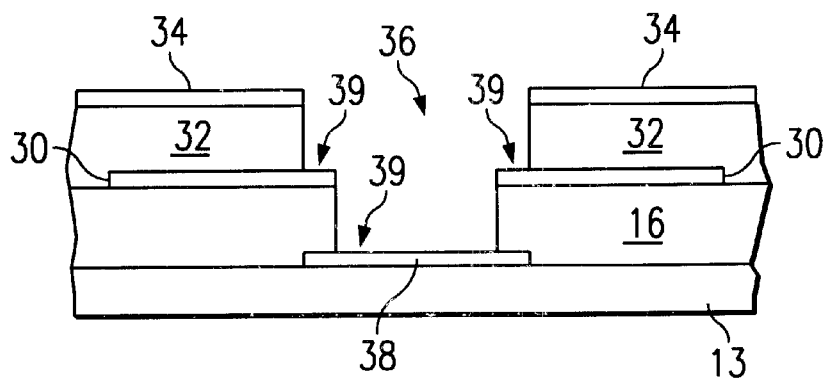

As shown in FIG. 5, an opening 36 is then created by, e.g., a directional dry etch into the passivation layer 32 through to pad 38. The photoresist 34 serves as one mask for the etching step that creates opening 36 and the conductive layer 30 serves as a hard mask for pad 38. In this way, the embedded conductive layer 30 also serves as a mask for the opening 36, thereby eliminating the patterning and etching steps that would be needed to etch an opening prior to the patterning of embedded conductive layer 30. Furthermore, the etch step exposes the for electrically conductive surfaces 39 on the conductive layer 30 and the pad 38 for subsequent electrical contact.

Figure 6:
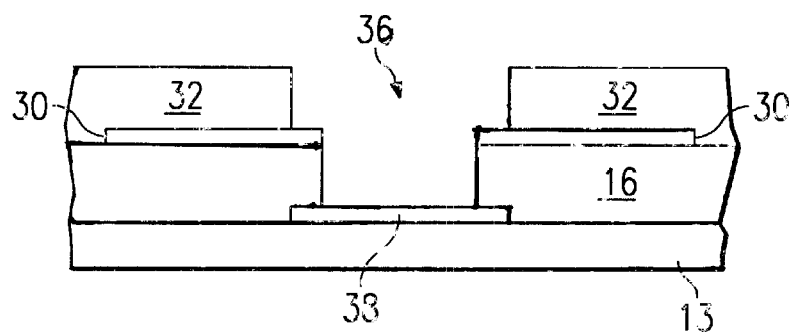

FIG. 6 shows a cross-section of the structure for the sensor that remains after the photoresist is removed, leaving an opening 36 that may have two different widths. The first width is the wider portion formed from the photoresist to the embedded conductive layer 30. The second more narrow portion extends from the top of the embedded conductive layer 30 to the pad 38.

Figure 7:
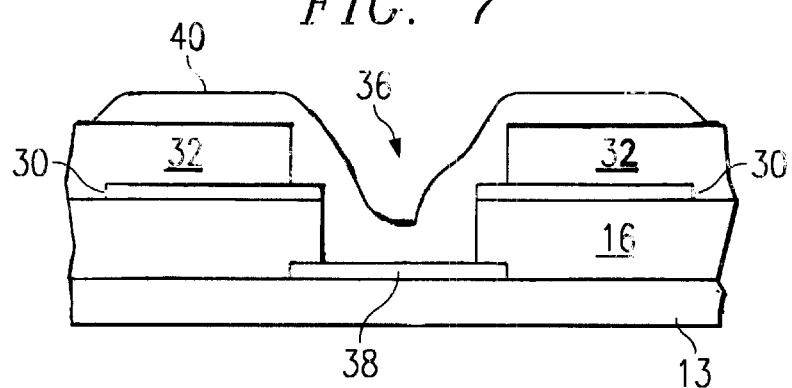

In FIG. 7 a cross-sectional view of the sensor structure is depicted where a conductive material 40 is deposited or flowed into the opening 36 to make an electrical contact between the surface 39 of the embedded conductive layer 30 and the surface 39 of pad 38. The conductive material 40 may be used as a via between layer or can even be used to run a conductive metal line between the conductive layer 30 and a ground for an electrostatic discharge circuit.

Figure 8:
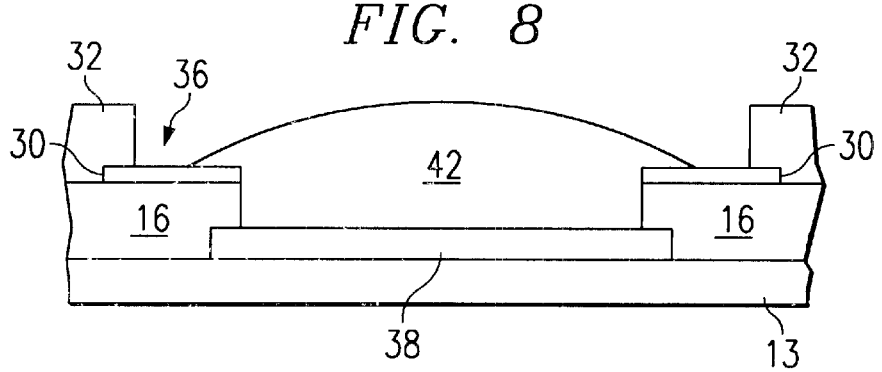
FIG. 8 is a cross-section of one embodiment of the electrostatic discharge protection system according to the present invention.

FIG. 8 shows a cross-sectional view of an alternative embodiment of the contact opening in which solder 42 is reflowed into the opening 36. The solder 42 may be from a solder ball. Whether the conductive material 40 is a conductive epoxy, a solder ball or even wire bonding, the present method eliminates the need for a masking and etching step prior to depositing the embedded conductive layer 30. The pad 38 may be used as a grounding pad or may be connected through a via (not depicted) to a solder ball or grid array for connection of the embedded conductive layer 30 to a ground on a printed circuit board that is separate from the ground used with the sensor.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of forming an electrostatic discharge device contact comprising the steps of:

forming a pad on a substrate;

forming a composite protective layer between and over conductive plates and over and around the pad, wherein the protective layer isolates the conductive plates and pad and protects them from damage, and wherein the protective layer comprises a dielectric region underlying an electrostatic discharge region extending partially over the pad;

patterning a photoresist over the electrostatic discharge region, wherein the photoresist pattern partially covers the electrostatic discharge region; and etching an opening through the protective layer and adjacent the electrostatic discharge region, wherein the photoresist and the electrostatic discharge region serve as masks during etching through a portion of the protective layer below the electrostatic discharge region, thereby forming the opening to the pad.

2. The method of claim 1, further comprising the step of:

forming a passivation layer over the dielectric region and the electrostatic discharge region.

3. The method of claim 2, further comprising the step of:

patterning a photoresist on the passivation layer, wherein the photoresist pattern partially covers the electrostatic discharge region; and etching an opening through the passivation layer and the insulating layer, wherein the photoresist and the electrostatic discharge region serve as masks during a subsequent etch step.

4. The method of claim 1, further comprising the step of:

etching an opening through the protective layer to the pad; and depositing a conductive material in the opening to form an electrical contact between the pad and the electrostatic discharge region.

5. The method of claim 4, wherein the conductive material comprises a conductive polymer.

6. The method of claim 4, wherein the conductive material comprises a wire bond.

7. The method of claim 4, wherein the conductive material comprises solder.

8. A method of forming an electrostatic discharge device contact comprising the steps of:

forming a pad on a substrate;

depositing a composite protective layer between and over conductive plates and over and arround the pad, wherein the protective layer isolates the conductive plates and pad and protects them from damage, and wherein the protective layer comprises a dielectric region underlying a conductive layer;

forming a passivation layer over at least a portion of the conductive layer;

patterning a photoresist over at least a portion of the passivation layer and the conductive layer;

etching an opening through the passivation layer, the conductive layer and the protective layer, wherein the photoresist and the conductive layer serve as masks during etching through the protective layer; and depositing a conductive material in the opening to form an electrical contact between the pad and the conductive layer.

9. The method of claim 8, wherein the conductive material comprises a conductive polymer.

10. The method of claim 8, wherein the conductive material comprises a metal.

11. The method of claim 8, wherein the conductive material comprises solder.

12. The method of claim 8, wherein the conductive material comprises solder.

13. The method of claim 8, wherein the thickness of the dielectric layer is between approximately 6,000 and 12,000 angstroms.

14. The method of claim 8, wherein the dielectric material comprises oxide.

15. The method of claim 8, wherein the dielectric material comprises a doped glass.

16. The method of claim 8, wherein the dielectric material comprises a first dielectric layer disposed under a second dielectric layer.

17. The method of claim 16, wherein the first and second dielectric layers comprise different compatible materials.

18. The method of claim 16, wherein the first dielectric layer comprises oxide.

19. The method of claim 16, wherein the first dielectric layer comprises doped glass.

20. The method of claim 16, wherein the second dielectric layer comprises nitride.

21. The method of claim 16, wherein the first and second dielectric layers have a thickness between approximately 3,000 and 6,000 angstroms.

22. The method of claim 8, wherein the conductive layer has a sheet resistance low enough to adequately dissipate the electrostatic charge.

23. The method of claim 8, wherein the conductive layer comprises aluminum.

24. The method of claim 8, wherein the conductive layer has a thickness of between approximately 5,000 to 15,000 angstroms.

25. The method of claim 8, wherein the conductive layer has a resistivity of approximately 0.04 ohms per square.

26. The method of claim 8, wherein the conductive layer comprises titanium.

27. The method of claim 26, wherein the conductive layer has a thickness of between approximately 500 to 1,000 angstroms.

28. The method of claim 26, wherein the conductive layer has a resistivity of approximately 0.14 ohms per square.

29. The method of claim 8, wherein the conductive layer comprises tungsten.

30. The method of claim 29, wherein the conductive layer has a thickness of between approximately 4,000 to 8,000 angstroms.

31. The method of claim 29, wherein the conductive layer has a resistivity of approximately 0.14 ohms per square.

32. The method of claim 8, wherein the passivation layer has an optimum thickness to prevent damage to the underlying conductive plates due to use and environment while also allowing an electrostatic charge to dissipate through the conductive layer.

33. The method of claim 8, further comprising the step of:

forming a composite passivation layer disposed over at least a portion of the dielectric layer.

34. The method of claim 33, wherein the passivation layer comprises silicon carbide.

35. The method of claim 33, wherein the passivation layer comprises silicon nitride.

36. The method of claim 33, wherein the passivation layer has a thickness of between approximately 2,000 and 3,000 angstroms.

* * * * *